United States Patent [19]

Scheuble et al.

[11] Patent Number: 4,702,562
[45] Date of Patent: Oct. 27, 1987

[54] LIQUID CRYSTAL PHASE

[75] Inventors: Bernhard Scheuble, Alsbach; Rudolf Eidenschink, Münster; Georg Weber, Erzhausen, all of Fed. Rep. of Germany

[73] Assignee: Merck Patent Gesellschaft mit beschrankter Haftung, Darmstadt, Fed. Rep. of Germany

[21] Appl. No.: 692,074

[22] Filed: Jan. 17, 1985

[30] Foreign Application Priority Data

Jan. 17, 1984 [DE] Fed. Rep. of Germany ....... 3401338

[51] Int. Cl.⁴ .................. G02F 1/13; C09K 19/54; C09K 19/06; C09K 19/30
[52] U.S. Cl. .................. 350/350 R; 252/299.5; 252/299.68; 252/299.63; 252/299.61; 252/299.6; 252/299.4; 252/299.62; 252/299.64; 252/299.65; 252/299.66; 252/299.67
[58] Field of Search ............. 252/299.62, 299.4, 299.6, 252/299.01, 299.5, 299.61, 299.66, 299.67, 299.68, 299.63, 299.64, 299.65; 350/350 R

[56] References Cited

U.S. PATENT DOCUMENTS

| | | | |
|---|---|---|---|
| 3,919,106 | 11/1975 | Asai et al. | 252/299.4 |
| 4,333,709 | 6/1982 | Dubois et al. | 252/299.4 |
| 4,430,650 | 2/1984 | Billard et al. | 252/299.62 |
| 4,578,210 | 3/1986 | Praefcke et al. | 252/299.6 |

FOREIGN PATENT DOCUMENTS 60-79090  5/1985  Japan .................. 252/299.62

OTHER PUBLICATIONS

F. C. Frank, Discuss. Faraday Soc. 25 (1958) 19.
A. Saupe, "Temperaturahaengigkeit und Groesse ..." Z. Naturforschung 15 a, 810–814 (1960).
A. Saupe, "Die Biegungselastizitaet der nematischen Phase von Azoxyanisol", Z. Naturforschung 15 a, 815–822 (1980).
W. H. de Jeu, "Physical Properties of Liquid Crystalline Materials", Gordon and Breach, New York (1980).
H. J. Deuling, "Elasticity of Nematic Liquid Crystals", Solid State Physics, vol. 34, 77.
Tinh et al, Liq. Crystals & Ordered Fluids, vol. 4, pp. 1123–1130, 1984, from Proceedings of A.C.S. Symposium in USA of 1982.
Destrade et al, MCLC, 1981, 71, 111–135.
Tinh et al, MCLC, 1981, 68, 101–111.
Levulet, J. de Physique, 40, 1979, L–81–L–84.
Chandrasekhar, MCLC, 1981, 63, 171–180.
Sorai et al, MCLC, 1980, 80, 33–58.

Primary Examiner—Teddy S. Gron
Assistant Examiner—J. E. Thomas
Attorney, Agent, or Firm—Millen & White

[57] ABSTRACT

Nematic liquid crystal phases containing at least one liquid-crystalline compound, which exhibits at least one discotic phase, are suitable for electro-optic display elements with high multiplexing rates.

9 Claims, No Drawings

LIQUID CRYSTAL PHASE

BACKGROUND OF THE INVENTION

This invention relates to nematic liquid crystal phases containing at least one liquid-crystalline compound which exhibits at least one discotic phase, suitable for use in liquid crystal display elements.

Liquid crystal phases are of great importance for liquid crystal display elements, in particular in dielectrics for electro-optical display elements which are based, for example, on the principle of the twisted cell (TN cell), the guest-host effect, the effect of the deformation of aligned phases or the effect of dynamic scattering. Liquid crystal display elements for a large flow of information, such as occurs, for example, in the office section, in data processing (inter alia, graphical representations on computer terminals) and in televisions, are gaining increasing importance. The information density is limited in these applications by the multiplexing capability of the liquid crystal displays. Electro-optic effects with a pronounced non-linearity of the electrooptic characteristic are therefore required. At present, the principle of the twisted cell is most widely used. The technology for the TN cell has undergone the most extensive development. Theoretical calculations and experimental investigations have now shown that the steepness of the transmission characteristic of a TN cell depends very substantially on the elastic constants of the liquid crystal phase used.

To obtain a very steep transmission characteristic for a TN cell, it is necessary in particular that the ratio $K_3/K_1$ of the elastic constants for bending and spreading is as small as possible (see, for example, D. W. Berreman, *Nonemissive Electrooptic Displays*, Plenum, New York, 1976, pages 9 et seq., in particular page 23; G. Baur, *The Physics and Chemistry of Liquid Crystal Devices*, Plenum, New York, 1980, page 61; B. S. Scheuble and G. Baur, 11. Freiburger Arbeitstagung Flussigkristalle (11th Freiburg Liquid Crystal Symposium), Freiburg, 1981, 8).

The way in which a small ratio $K_3/K_1$ in nematic liquid crystal phases can be obtained is discussed, for example, in "B. S. Scheuble and G. Baur, *Proceedings of Japan Display* '83, Kobe, Japan, 1983, page 224". Herein, "small" relates in general to ratios of about 1.6 or lower.

SUMMARY OF THE INVENTION

It is thus an object of the present invention to provide new liquid crystal phases for liquid crystal display elements with a high multiplexing capability.

Upon further study of the specification and appended claims, further objects and advantages of this invention will become apparent to those skilled in the art.

It has been found that the liquid crystal phases according to this invention are outstandingly suitable for displays with high multiplexing rates.

The invention therefore relates to nematic liquid crystal phases containing at least one liquid-crystalline compound which exhibits at least one discotic phase, in particular for improving the multiplexing properties, and to liquid crystal display elements, in particular electrooptic display elements, which contain such phases.

Furthermore, the invention relates to the use of liquid-crystalline discotic compounds as components of nematic liquid crystal phases.

DETAILED DISCUSSION

The liquid crystal phase according to the invention contains at least one liquid-crystalline compound which exhibits at least one discotic phase.

In phases according to the invention the preferred percentage decrease in $K_3/K_1$ which is to be effected by addition of m percent by weight of at least one discotic compound is preferably $\geq$m %, in particular $\geq$2m %.

Many instances of discotic liquid crystals have been described in the past in the literature, for example J. Billard in W. Helfrich and G. Heppke (Editors) "Liquid Crystals of One- and Two-Dimensional Order", pages 383-395, Springer Verlag, Berlin, Heidelberg, New York (1980);

S. Chandrasekhar, Phil. Trans. R. Soc. Lond., Ser. A., 309, (1983), 93-103;

S. Chandrasekhar, Mol. Cryst. Liq. Cryst. 63, (1981), 171;

S. Chandrasekhar, Adv. Liq. Cryst. 5 (1982), 47-78;

C. Destrade, N. H. Tinh, H. Gasparoux, J. Malthete and A. M. Levelut, Mol. Cryst. Liq. Cryst. 71, (1981), 111;

C. Destrade, H. Gasparoux, P. Foucher, N. H. Tinh, J. Malthete and J. Jacques, J. Chim. Phys. Phys-Chim. Biol. 80 (1) (1983), 137-148;

A. M. Levelut, J. Chim. Phys. Phys-Chim. Biol. 80, (1) (L983), 149-161, all of which are incorporated by reference herein as are the references cited below. All of these are suitable for use in this invention inter alia.

Discotic liquid crystals have a disc-shaped molecular structure and rigid, plane centers of various structures (for example aromatics, such as benzene derivatives, for example of the formula A) (for example, S. Chandrasekhar, Liq. Cryst., Proc. Int. Conf., Heyden, London, pages 41-51, 79 (1980); German Offenlegungsschrift No. 3,332,955; S. Chandrasekhar, B. K. Sadashiva and K. A. Suresh, Pramana 9 (1977), 471; S. Chandrasekhar et al. J. d. Phys. 40 (1979), C3-120)), triphenylene derivatives, for example of the formula B (for example C. Destrade, M. C. Mondon and J. Malthete, J. de Phys. 40 (1979), C3-17; European Published Application No. 30,879) or truxenes, for example of the formula C (for example C. Destrade, J. Malthete, N. H. Tinh and H. Gaspa-roux, Phys. Lett. A, 78A (1980), 82; L. Mamlok, J. Malthete, N. H. Tinh, C. Destrade and A. M. Levelut, J. Phys. Lett. 43 (1982), L-641), saturated rings, such as cyclohexane derivatives, for example of the formula D (for example B. Kohne and K. Praefcke, 21. Bunsen-Colloquium, Technical University of Berlin, September/October 1983; German Offenlegungsschrift No. 3,332,955) or saturated hetero-ring systems formed by H bridges (for example J. D. Bunning, J. E. Lydon, C. Eaborn, P. M. Jackson, J. W. Goodby and G. W. Gray, J. Chem. Soc., Faraday Trans. I, 78 (1982), 713; or organo-metallic derivatives (for example French Published Application No. 2,486,946).

In most cases, these centers carry flexible side groups X. Those discotic liquid crystals are particularly preferred which have 3 to 6, in particular 5 or 6, side groups X. In addition, however, those discotic liquid crystals which have a center of several rings (for example of formula B or C) and have less than 3 side groups X, in particular only one side group X, are also preferred.

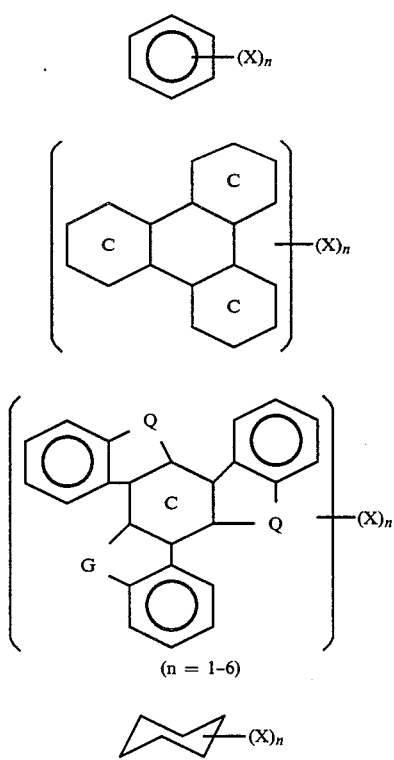

(n = 1-6)

The above formulae are intended only to illustrate the structures of discotic liquid crystals, without limiting them.

If the compounds of the formulae (A) and (D) carry only 3 or 4 substituents X, these are preferably in the 1,3,5-positions and 1,2,4,5-positions respectively. The substituents X in compounds of the formula (B) are preferably in the 2,3,6,7,10 and/or 11-positions.

The substituents X in compounds of the formula C are preferably in the para-position relative to Q and/or in that m-position relative to Q which is remote from the inner ring. Q is preferably —O— or —CH$_2$—.

The substituents X in compounds of the formula D are preferably in equatorial positions.

The groups X can be identical or different. Preferably, however, they are identical and are selected from the group comprising —R, —OR, —COR, —OCOR, —COOR, —SR, —SOR and —SO$_2$R.

The radicals R are linear or branched alkyl radicals, in which it is also possible for one ("oxaalkyl") or two ("dioxaalkyl") non-terminal non-adjacent CH$_2$ groups to be replaced by O atoms. Preferably, they are linear, have 2, 3, 4, 5, 6, 7, 8, 9, 10, 11 or 12 C atoms and accordingly are preferably ethyl, propyl, butyl, pentyl, hexyl, heptyl, octyl, nonyl, decyl, undecyl, 2-oxapropyl (=methoxymethyl), 2-(ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7-, 8- or 9-oxacecyl, 2-, 3-, 4-, 5-, 6-, 7-, 8-, 9-, 10- or 11-oxadodecyl or tridecyl, tetradecyl, pentadecyl, hexadecyl, heptadecyl or octadecyl. Linear alkyl radicals R having 8 to 12 C atoms are particularly preferred. Particularly preferred groups X are —OR, —OCOR, —COOR, —SR, —SOR and —SO$_2$R.

The nematic liquid crystal phases according to the invention contain about 0.1 to 30%, preferably 5 to 10%, of one or more discotic compounds.

The further constituents of the liquid crystal phase according to the invention can be of very diverse nature. A wide variety of liquid crystal compounds is available to an expert from the state of the art. These compounds can be selected by routine methods. 2 to 15, preferably 3 to 12, components are normally used, and these are preferably selected from the group comprising the nematic or nematogenic substances, in particular the known substances from the azoxybenzene, benzylideneaniline, biphenyl, terphenyl, phenyl or cyclohexyl benzoate, phenyl or cyclohexyl cyclohexane-carboxylate, phenylcyclohexane, cyclohexylbiphenyl, cyclohexylcyclohexane, cyclohexylnapthalene, 1,4-bis-cyclohexylbenzene, 4,4'-bis-cyclohexylbiphenyl, phenyl- or cyclohexyl-pyrimidine, phenyl- or cyclohexyl-dioxane, halogenated or non-halogenated stilbenes, benzyl phenyl ether, tolane, substituted cinnamic acid, phenyl- or cyclohexyl-1,3-dithiane, 1,2-bis-cyclohexylethane, 1-phenyl-2-cyclohexyl-ethane and 1,2-bis-phenylethane classes.

The most important compounds of those which can be used as further constituents of liquid crystal phases according to the invention can be characterized by the formula I

R'—L—G—E—R''  I wherein L and E are each a carbocyclic or heterocyclic ring system from the group comprising 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, G is

| | |
|---|---|
| —CH=CH— | —N(O)=N— |
| —CH=CY— | —CH=N(O)— |
| —C≡C— | —CH$_2$—CH$_2$— |
| —CO—O— | —CH$_2$—O— |
| —CO—S— | —CH$_2$—S— |
| —CH=N= | —COO—Phe—COO— | or a C—C single bond, Y is halogen, preferably chlorine, or —CN, and R' and R" are alkyl, alkoxy, alkanoyloxy or alkoxycarbonyloxy each having up to 18, preferably up to 12, carbon atoms, or one of these radicals can also be CN, NC, NO$_2$, CF$_3$, F, Cl or Br.

In most of these compounds, R' and R" are different, one of these radicals being an alkyl or alkoxy group in most cases. However, other variants of these envisaged substituents are also usual. Many such substances and also mixtures thereof are commercially available. All these substances can be prepared by methods known from the literature.

The phases according to the invention are prepared in a conventional manner. As a rule, the components are dissolved in one another, advantageously at elevated temperatures.

The phases according to the invention can also be modified by additives. Such additives are known to the expert and are extensively described in the literature. For example, conductivity salts, preferably ethyldimethyl-dodecyl-ammonium 4-hexyloxybenzoate, tetrabutylammonium tetraphenylboranate or complex salts of crowned ethers (cf. e.g. I. Haller et. al., Mol. Cryst. Liq. Cryst., volume 24, pages 249-258 (1973)) can be added for improving the conductivity, dichroic dyes can be added for the preparation of coloured guest-host systems, or substances for modifying the dielectric anisotropy, the viscosity and/or the orientation of the nematic phases can be added. Such substances are described, for example, in German Offenlegungsschriften Nos. 2,209,127, 2,240,864, 2,321,632, 2,338,281, 2,450,088, 2,637,430, 2,853,728 and 2,902,177.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A liquid-crystalline phase consisting of
22% of p-trans-4-propylcyclohexylbenzonitrile,
19% of p-trans-4-butylcyclohexylbenzonitrile,
30% of p-trans-4-pentylcyclohexylbenzonitrile,
15% of 4-cyano-4'-(trans-4-pentylcyclohexyl)-biphenyl and
14% of 4-p-cyanophenyl-4'-pentyl-biphenyl
has a $K_3/K_1$ ratio of 1.97 at 41°. An addition of 15% of 2-ethyltriphenylene to the above mixture significantly lowers $K_3/K_1$ to a value of 1.37.

EXAMPLE 2

At 55°, the liquid-crystalline phase from Example 1 has a $K_3/K_1$ ratio of 1.83. An addition of 15% of 2-ethyltriphenylene significantly lowers $K_3/K_1$ to a value of 1.30.

EXAMPLE 3

A liquid-crystalline phase consisting of
14% of p-trans-4-propylcyclohexylbenzonitrile,
10% of p-trans-4-butylcyclohexylbenzonitrile,
20% of p-trans-4-pentylcyclohexylbenzonitrile,
14% of trans-1-p-ethylphenyl-4-propylcyclohexane,
20% of 4-ethyl-4'-(trans-4-pentylcyclohexyl)-biphenyl,
4% of 4-cyano-4'-(trans-4-pentylcyclohexyl)-biphenyl,
13% of 4-(trans-4-pentylcyclohexyl)-4'-(trans-4-propylcyclohexyl)-biphenyl and
5% of hexakis-(hexylsulfonyl)-benzene
has a clear point of 75°.

EXAMPLE 4

A liquid-crystalline phase consisting of
11% of p-trans-4-propylcyclohexylbenzonitrile,
21% of p-trans-4-butylcyclohexylbenzonitrile,
12% of 4-ethyl-4'-cyanobiphenyl,
9% of 4-butyl-4'-cyanobiphenyl,
13% of p-ethoxyphenyl trans-4-propylcyclohexanecarboxylate,
14% of p-methoxyphenyl trans-4-pentylcyclohexanecarboxylate,
10% of 4-(trans-4-pentylcyclohexyl)-4'-(tnans-4-propylcyclohexyl)-biphenyl,
5% of 4-cyano-4'-(trans-4-pentylcyclohexyl)-biphenyl and
5% of hexa-O-decanoyl-scyllo-inositol
has a clear point of 60°.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a nematic liquid crystal phase, comprising at least two liquid-crystalline compounds, selected from the nematic and nematogenic azoxybenzene, benzylideneaniline, biphenyl, terphenyl, phenyl or cyclohexyl benzoate, phenyl or cyclohexyl cyclohexanecarboxylate, phenylcyclohexane, cyclohexylbiphenyl, cyclohexylcyclohexane, cyclohexylnaphthalene, 1,4-bis-cyclohexylbenzene, 4,4'-bis-cyclohexylbiphenyl, phenyl- or cyclohexyl-pyrimidine, phenyl- or cyclohexyl-dioxane, haloganted or non-halogenated stilbenes, benzyl phenyl ether, tolane, substituted cinnamic acid, phenyl- or cyclohexyl-1,3-dithiane, 1,2-bis-cyclohexylethane, 1-phenyl-2-cyclohexyl-ethane or 1,2-bis-phenylethane classes,
the improvement wherein the phase further comprises at least one liquid crystalline discotic compound of the formula:

wherein
n=3-6 and
x is R, —OR, —COR, —OCOR, —COOR, —SR, —SOR or —SO$_2$R and
R is C1-12 alkyl or C1-12-alkyl wherein one or two non-adjacent and non terminal CH$_2$ groups are replaced by O atoms.

2. A nematic liquid crystal phase of claim 1, wherein the amount of said liquid crystalline discotic compound is effective to lower $K_3/K_1$ compared with $K_3/K_1$ for the same phase without the discotic compound.

3. A phase of claim 2 wherein the amount of the discotic compound(s) is 0.1 to 30 wt %.

4. A phase of claim 2 wherein the amount of the discotic compound(s) is 5 to 10 wt %.

5. In a liquid crystal display element, comprising a nematic liquid crystal phase, the improvement wherein the phase is one of claim 1.

6. In a liquid crystal display element, comprising a nematic liquid crystal phase, the improvement wherein the phase is one of claim 2.

7. A display element of claim 5 wherein in said phase, the amount of discotic compound(s) is 0.1 to 30 wt %.

8. A display element of claim 5 which is an electro-optical display element and said phase is a liquid crystalline dielectric.

9. A method of lowering the ratio $K_3/K_1$ in a nematic liquid crystalline phase comprising at least two liquid crystalline components selected from the nematic and nematogenic azoxybenzene, benzylideneaniline, biphenyl, terphenyl, phenyl or cyclohexyl benzoate, phenyl or cyclohexyl cyclohexane-carboxylate, phenylcyclohexane, cyclohexylbiphenyl, cyclohexylcyclohexane, cyclohexylnaphthalene, 1,4-bis-cyclohexylbenzene, 4,4'-biscyclohexylbiphenyl, phenyl- or cyclohexyl-pyrimidine, phenyl- or cyclohexyl-dioxane, halogenated or non-halogenated stilbenes, benzyl phenyl ether, tolane, substituted cinnamic acid, phenyl- or cyclohexyl-1,3-dithiane, 1,2-bis-cyclohexylethane, 1-phenyl-2-cyclohexyl-ethane or 1,2-bis-phenylethane classes, comprising adding to said phase an amount of at least one liquid crystalline discotic compound effective to lower said ratio, said discotic compound being of the formula:

wherein
n=3-6 and
x is R, —OR, —COR, —OCOR, —COOR, —SR, —SOR or —SO$_2$R and
R is C1-12 alkyl or C1-12-alkyl wherein one or two non-adjacent and non terminal CH$_2$ groups are replaced by O atoms.

* * * * *